United States Patent [19]
Pardoe

[11] Patent Number: 5,992,220
[45] Date of Patent: Nov. 30, 1999

[54] TESTING OF ACCESS CHAMBER SYSTEM INSTALLATION

[75] Inventor: Trevor Pardoe, North Yorkshire, United Kingdom

[73] Assignee: Fibresec Holdings Ltd., United Kingdom

[21] Appl. No.: 08/942,968

[22] Filed: Oct. 3, 1997

[30] Foreign Application Priority Data

Apr. 30, 1997 [GB] United Kingdom .................... 9708763
Aug. 11, 1997 [GB] United Kingdom .................... 9716835

[51] Int. Cl.⁶ ..................................................... G01M 3/26
[52] U.S. Cl. ............................................. 073/49.2; 073/40
[58] Field of Search ........................................ 73/40, 49.2

[56] References Cited

FOREIGN PATENT DOCUMENTS

| 2900960 | 7/1979 | Germany ................................. 73/49.2 |
| 648665 | 3/1985 | Switzerland ............................. 73/49.2 |

*Primary Examiner*—Daniel S. Larkin
*Attorney, Agent, or Firm*—Kohn & Associates

[57] ABSTRACT

Apparatus for testing the integrity of an access chamber system during or after installation thereof, includes a connection for making substantially fluid-tight connection with any part of the chamber system, evacuation device for evacuating the air within the chamber system to provide a vacuum therein, and an indicator for monitoring the level of vacuum over a predetermined period of time.

13 Claims, 6 Drawing Sheets

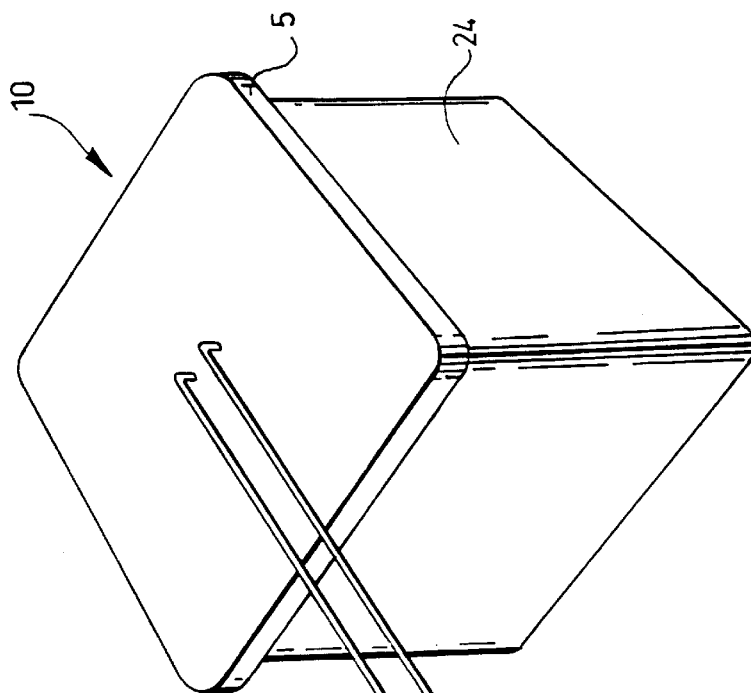
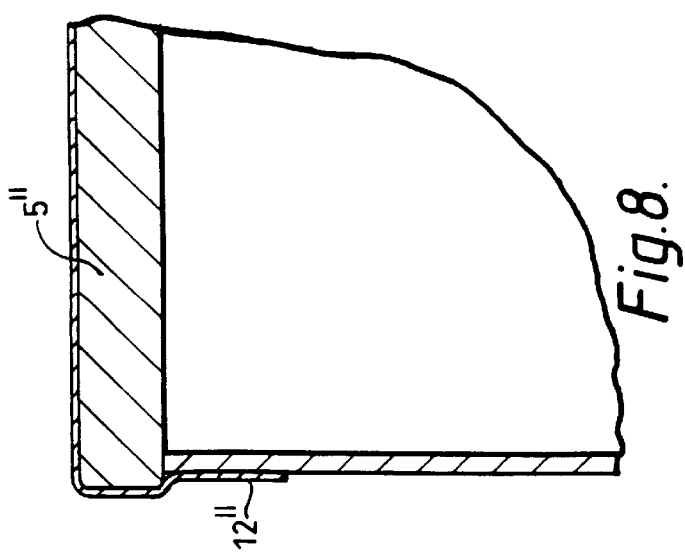

TESTING OF ACCESS CHAMBER SYSTEM INSTALLATION

BACKGROUND OF THE INVENTION

The present invention relates to apparatus and method primarily intended for testing the integrity of an access chamber system, at any stage prior to the completion of the installation, whereby there is an opportunity to correct any faults. The apparatus and method of the present invention may also be used on an existing access chamber system installation, to ensure that the installation is functioning correctly and/or to identify any faults or weaknesses in any part of the installation. This invention is designed to assist environmental issues of containing petroleum spirit (and associated vapor) within a chamber system and at the same time achieving a water free environment within said chamber.

The phrases "chamber system" or "access chamber system" are each to be interpreted as meaning any or all of access chamber itself, corbel, frame, neck or any extension piece(s), lid, suction lines or other utilities.

The installation of an access chamber involves a number of stages. Firstly, the chamber is fixed and sealed to the storage tank and this may be by one of the following:

(a) to the neck or lid of the manway lid, (b) to a separate upstand, or (c) to the fill pipe and/or other pipe flanges.

Then, one or more connections have to be made through the side wall of the access chamber for supply lines, electrical cables, and other utilities, and it may also be necessary to add an extension to the chamber, all of these connections must likewise be sealed. Finally, a corbel unit may be secured and sealed to the upper region of the access chamber, and this is also secured to a frame which is seated flush with ground level (the term "access chamber installation" is to be interpreted as encompassing any or all of these components).

At any or all of these stages, faults can occur in that the respective seals are not properly made. In particular, the interior of the access chamber must be adequately sealed to contain any spillage of petroleum spirit and/or associated vapor as well as against possible ingress of water from the ground surrounding the access chamber—the pressure on the chamber due to this ground water can be considerable, particularly in winter or wet weather conditions when the water table rises.

It is therefore the aim of the present invention to provide testing apparatus and method of testing which seeks to identify problems with the various seals used in the installation, ideally prior to the various stages of backfilling and concreting when remedial action would involve re-excavation, the testing apparatus conveniently being portable and suitable for a range of both round and square chambers of varying sizes.

SUMMARY OF THE INVENTION

According to a first aspect of the present invention there is provided apparatus for testing the integrity of an access chamber system during or after installation thereof, the apparatus including connection means for making substantially fluid-tight connection with any part of the chamber system, evacuation means for evacuating the air within the chamber system to provide a vacuum therein, and indicator means for monitoring the level of vacuum over a predetermined period of time.

The apparatus may include a separate lid for placing over the access chamber (or corbel, or frame), and this lid is preferably manufactured in a range of different sizes, to suit different access chamber installations. Up to approximately 36Δ square, the lid may be formed in a single piece, but for sizes larger than this it would be inconvenient to transport a single piece lid. Thus, the lid may (at least for larger sizes) comprise two panels each being hinged to a central member, such that the panels may each be pivoted about a respective axis running parallel to the longitudinal axis of the central member, between a stowed position in which the two panels are face to face, and an operative position in which the two panels are adjacent in the same plane, thereby forming the lid.

One possible option of the pivoted lid described in the previous paragraph is to utilize the central member to accommodate the vacuum pump, indicator (e.g pressure gauge) and associated electrical cable.

In an alternative embodiment, the evacuation means and indicator are remote from the lid, but are linked to it by means of two separate hoses or pipes, one to apply the vacuum and the other to test the vacuum. The apparatus can then be operated remotely (i.e at least a minimum distance away from the installation) to avoid the risk of fire or explosion due to any petrol vapour which may be in the area in or around the access chamber.

Conveniently, the central member also includes handle means, preferably one handle at each end of the central member, whereby the lid may be placed in position by one or two operatives. The central member also conveniently includes a lid which may be hinged or sliding, to give access to the interior of the central member.

Chamber sizes and shapes vary and any one size of lid will be required to function on a range of chambers and the sealing arrangement must be able to accommodate the variations.

The connection of a chamber unit to a corbel or extension piece requires the use of some form of seal and in the preferred seal arrangement this seal is designed with the dual function of acting as a seal between the chamber unit and the lid for the period of testing, and on completion of the test the seal then remains in place and functions to seal the chamber unit to either a corbel unit or extension piece. An advantage of this type of seal is that during the vacuum test the integrity of the seal to the chamber unit is tested. Material for this type of seal would typically be a "NEOPRENE" or EPDM closed cell foam (see FIG. 6).

In situations where a suitable chamber to corbel unit seal is not available, a seal is fitted to the face of the lid which extends around the periphery. The top edge of a chamber unit, corbel unit or extension piece embeds into the seal and when vacuum is applied the lid is pulled down onto the chamber ensuring an air-tight seal. Material for this type of seal would typically be a "NEOPRENE" or EPDM closed cell foam (see FIG. 7).

In situations where the lid outside shape corresponds very closely with the chamber unit, a third type of seal can be used. A thin length of rubber strip material joined to form a continuous band is stretched over the outside of both the lid and chamber, thus encapsulating the joint. The application of vacuum draws the rubber seal tighter against the two components enhancing the seal. Material for this type of seal would typically be Nitrile rubber (see FIG. 8).

In the case of the pivoted lid, the hinges are conveniently standard piano hinges. The hinged construction of this particular embodiment of the apparatus means that it may readily be collapsed into a portable unit, and then opened up on site to form a lid.

In the pivoted lid embodiment, the seal means comprises two separate seals, a first seal which extends around the periphery of the lid to form a seal with the upper edge of the access chamber or corbel unit (this first seal may take one of the two forms shown in FIGS. 6 and 7) and a second, thinner seal of for example nitrile rubber in the region of the two hinges between the central member and adjacent panels.

In use, the lid is placed on top of the access chamber (or corbel unit or frame), the vacuum pump is connected to the interior of the access chamber by means of a port in the lid, and a vacuum is created by evacuating the air within the chamber—as the vacuum increases, the first seal member is drawn into even closer contact with the chamber, such that the system is effectively self-sealing, provided that the lid is reasonably well positioned to begin with. When the desired vacuum is reached (typically 120 millibars) to simulate the pressure from the surrounding ground water), it is sustained for a period of time, typically 15 minutes or thereabouts. If the vacuum is maintained during this test period, the installation, and particularly the seals, is structurally sound, but if any seal is defective or badly or incorrectly fitted, a fairly sudden loss of vacuum will occur and the appropriate remedial action can be taken.

A further method for dealing with very small leaks which may not be easily detected by a change in vacuum level is to apply a liquid penetrant dye around the outside of all joints and seals—if a small leak exists the dye is drawn into the chamber unit where it is easily observed. The lid can be fitted with one or more viewing windows which allow the inside of the chamber unit to be observed during testing.

The installation can be tested at any time during the installation, and conveniently this would be done once all the necessary connections and seals have been made, but before completion. Or, each sealed connection can be tested separately, so that any fault can more easily be identified.

The installation can also be tested after installation, either on a routine basis or if a particular fault has arisen.

According to a second aspect of the present invention there is provided a method of testing the integrity of an access chamber during installation thereof, the method comprising the steps of connecting any part of the chamber system to evacuation means in a substantially fluid-tight manner, operating the evacuation means to evacuate the air within the chamber system to provide a vacuum therein, and utilizing indicator means to monitor the level of vacuum over a predetermined period of time.

In certain situations, the chamber may be fitted with an internal sump lid and in this case it would be possible to connect the evacuation and indicator means of the apparatus directly to this internal lid, removing the need for a separate lid forming part of the apparatus. Similarly, it would be possible in certain situations to connect the evacuation and indicator means directly to one or more suction lines forming part of the chamber system, again avoiding the need for a separate lid.

Embodiments of the present invention will now be described, by way of example only, with reference to the accompanying drawings, in which:

BRIEF DESCRIPTION OF THE DRAWINGS

FIG. 8 is a partial section showing a third variant of the first seal means, and FIG. 9 illustrates the remotely operated embodiment of the invention.

DETAILED DESCRIPTION OF THE PREFERRED EMBODIMENTS

Figure 1:
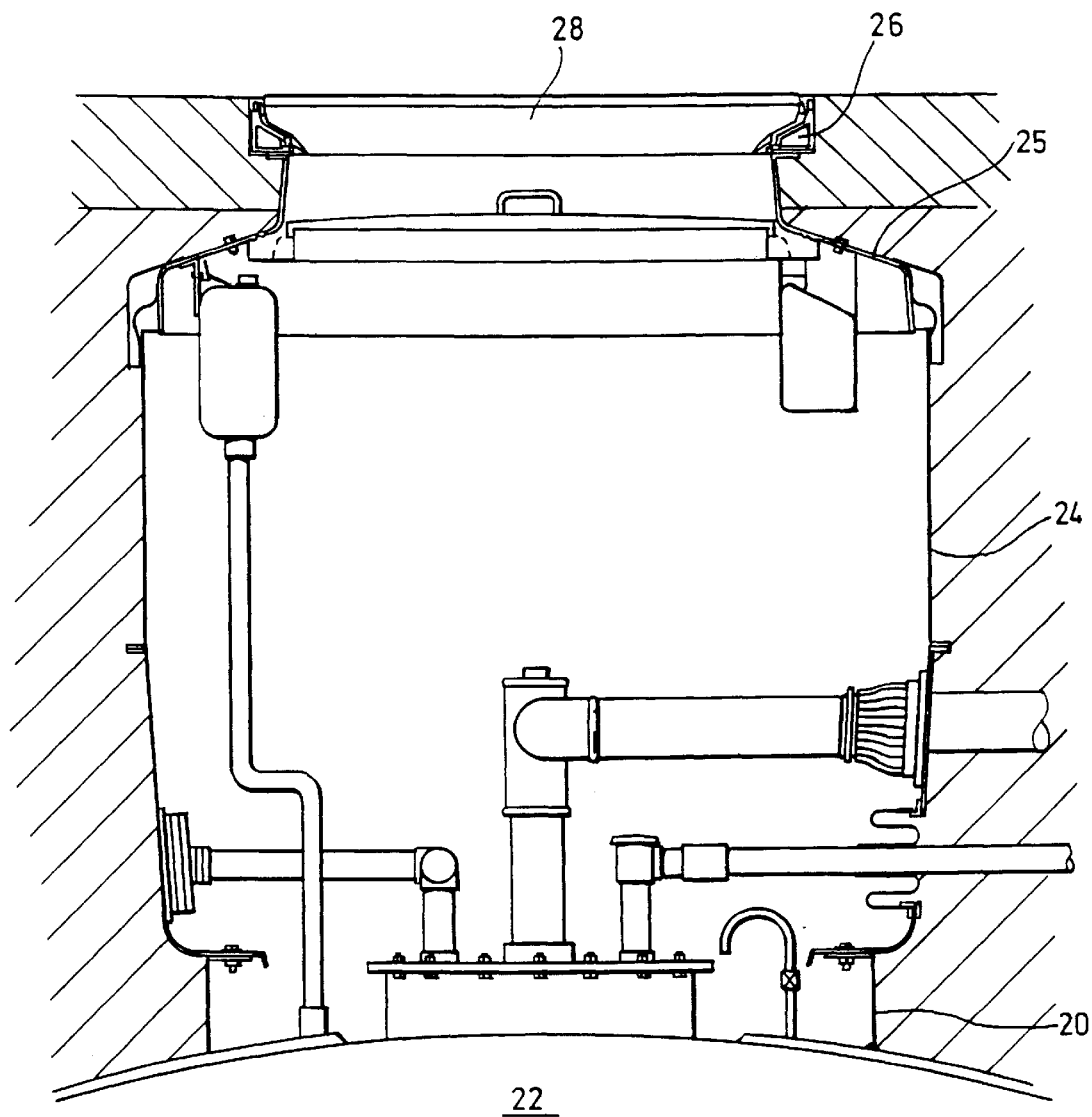
FIG. 1 illustrates a typical access chamber installation, to which the testing apparatus of the invention may be applied.

Referring to FIG. 1, a typical access chamber installation includes an upstand 20 protruding upwardly from the underground tank 22, the access chamber itself, 24, frame 26 seated flush with ground level and accommodating an access cover 28 therein, and a corbel unit 25 which is secured and sealed between the frame 26 and the access chamber 24. This drawing also illustrates the various connections which all have to be made and sealed during installation, for example between the upstand 20 and the access chamber 24, between the various supply pipes and the access chamber wall, and between the corbel unit 25 and access chamber 24 and between the corbel unit 25 and frame 26. This drawing also illustrates the tank neck, manway access lid and fill pipe.

Referring to the drawings, test apparatus 10 according to the present invention comprises two panels 4, 6 and a central member 2 in the form of a generally elongate box with a handle 2a at each end. The box is an aluminium extrusion comprising base and integral sidewalls, with a lid 2b, also an aluminium extrusion, which slides within channels 2c in the box sidewalls.

This box-like central member 2, as well as giving structural rigidity to the apparatus, also provides a housing for the vacuum pump, pressure gauge, and electrical cable (not shown). The vacuum pump may be a standard vacuum pump or a venturi pump.

The panels 4, 6 each being skinned glass fiber panels with a central core, are hinged to the central member 2 along its respective long sides by means of one or more adapted piano hinges 8 each of which has had one arm of the two (8a, 8b) reversed. A viewing window (not shown) may be incorporated into one or both panels 4, 6.

Figure 4:
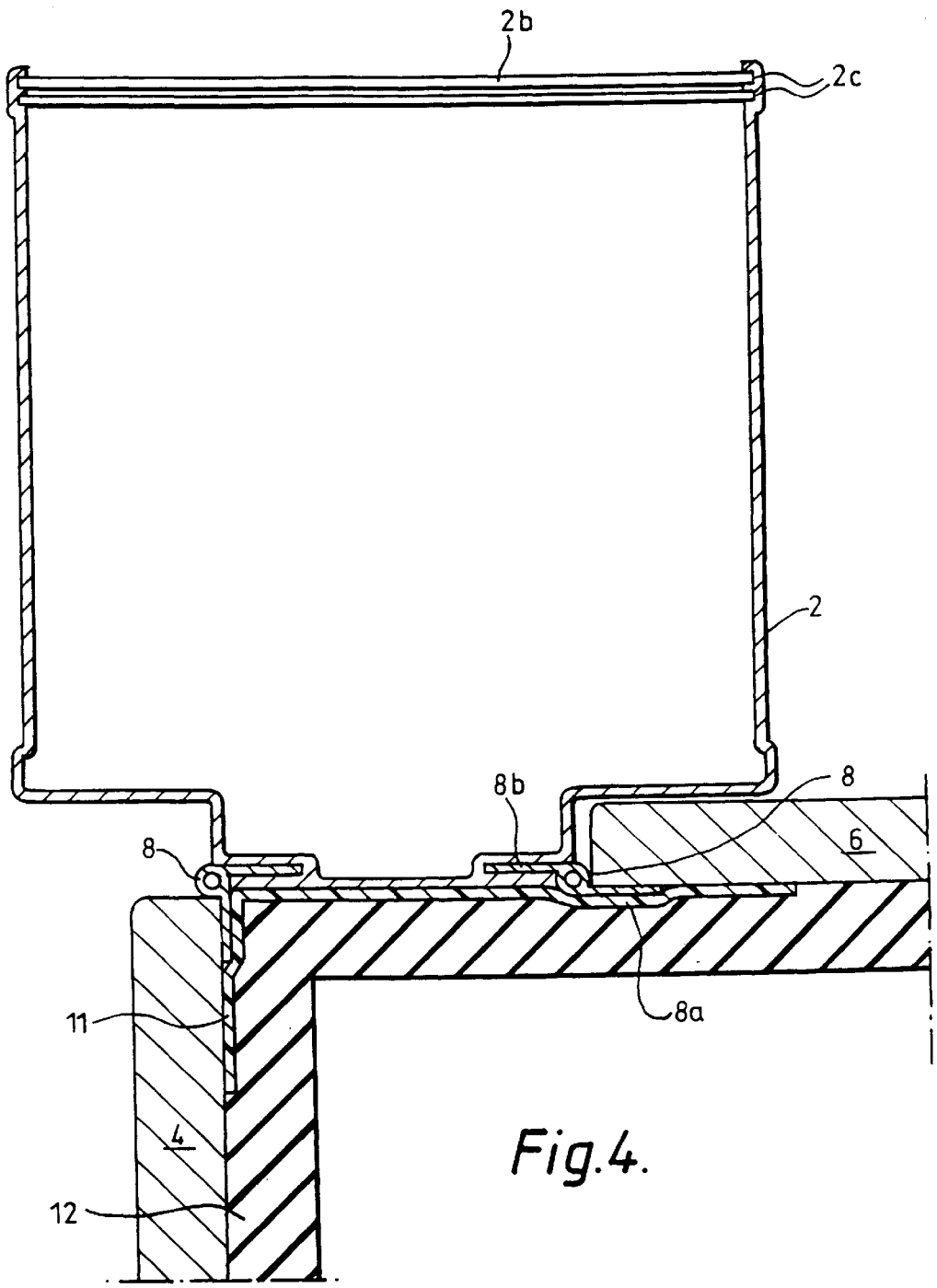
FIG. 4 is a section through the apparatus showing in particular the construction of the central member and the hinges.
Figure 5:
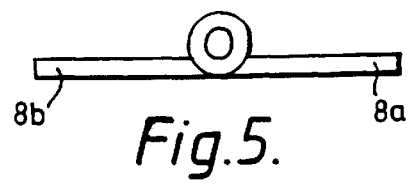
FIG. 5 is a detailed drawing of the hinge.

The hinge 8 is shown in FIG. 5 in the form in which it is supplied, and when one arm is reversed it appears as shown in FIG. 4. One arm 8b of each hinge 8 is glued into a corresponding slot in the base of the central member 2, and the other arm 8a is bonded and screwed to a respective panel 6 (4), the whole hinge area being sealed by a "NEOPRENE or EPDM" closed cell foam seal 11 which is thin enough to fold when the panels 4, 6 are pivoted on hinges 8.

Around the periphery of the lid formed by the two panels 4, 6 and the central member 2 there is provided a second, nitrile rubber seal 12, approximately 20 mm thick, to provide the necessary sealing engagement with the top of the access chamber.

Figure 2:
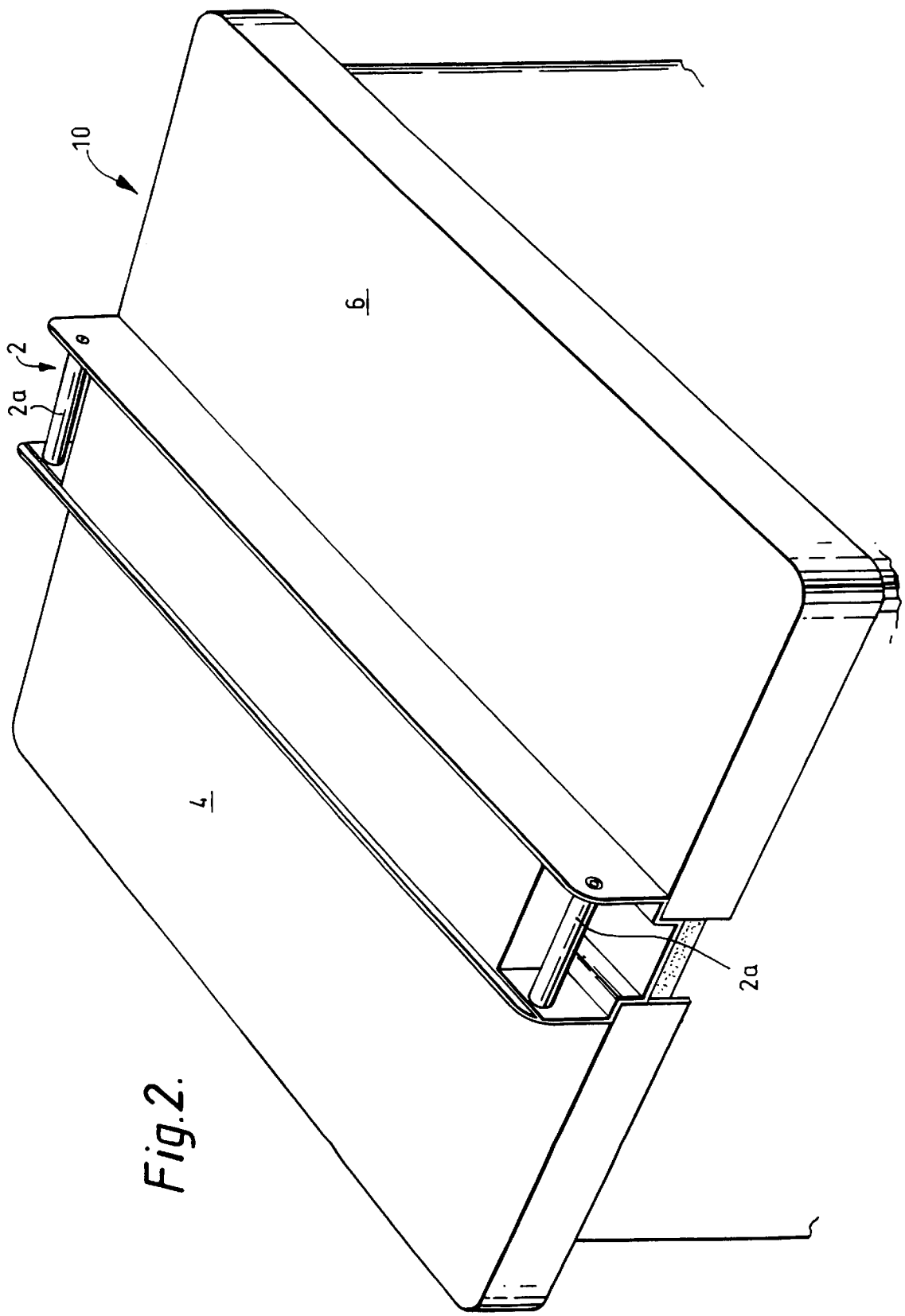
FIG. 2 is a perspective view of the apparatus in the operative position.
Figure 3:
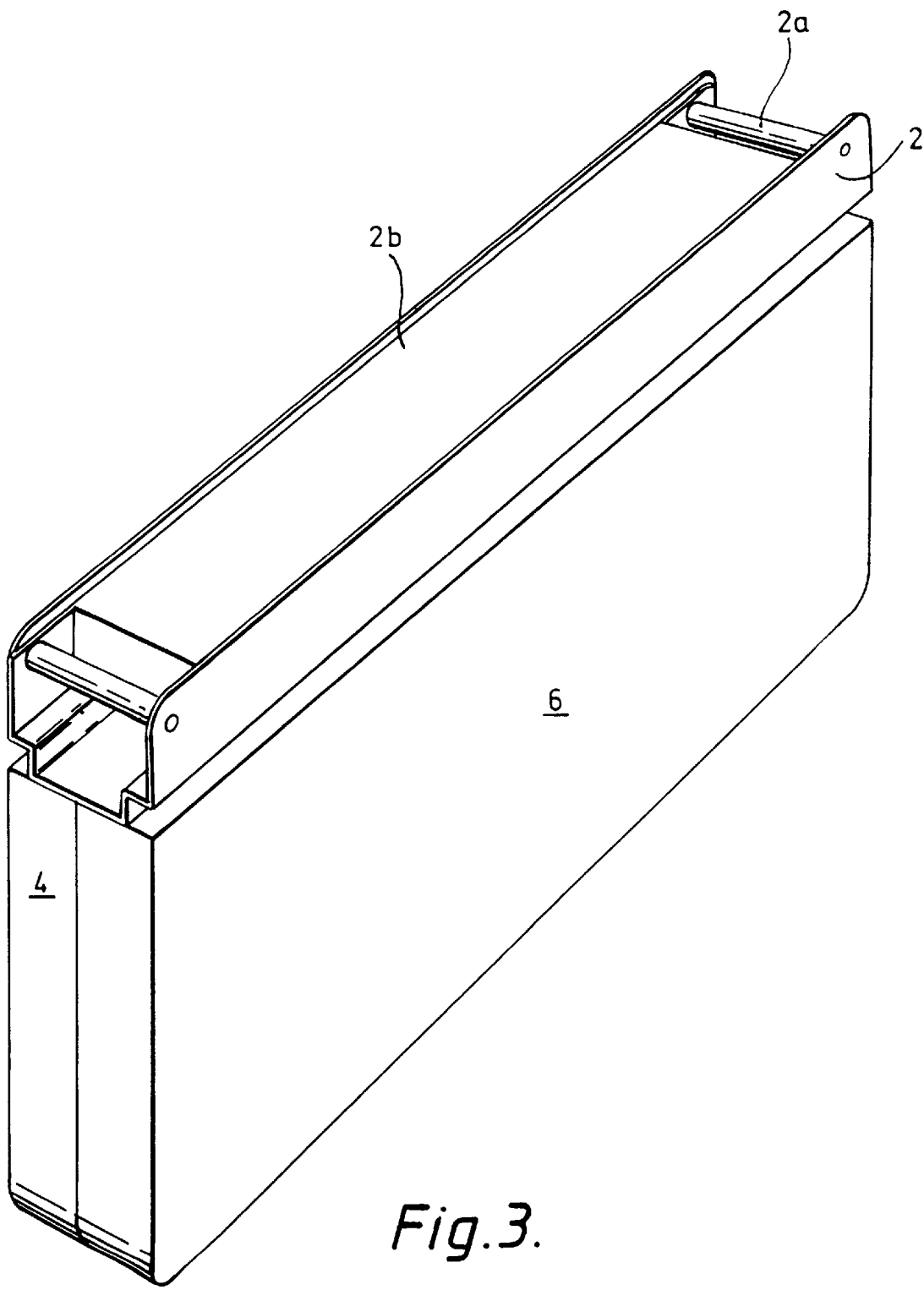
FIG. 3 is a perspective view of the apparatus in the stowed position.

In use, the panels 4, 6 are opened out from the position shown in FIG. 3 to that shown in FIG. 2, the lid is placed in position over the top of the access chamber, such that seal 12 rests on the upper edge of the chamber, (or alternatively on the upper edge of the corbel or frame), and the vacuum pump (not shown) is connected to the interior of the chamber via a connection port (not shown) in the base of the central member 2. Vacuum is then applied, which pulls the lid down onto the access chamber (or corbel or frame) until seal 12 becomes substantially fluid-tight, whereupon the vacuum builds up to the desired level, typically 120 millibars which is then maintained for approximately 15 minutes. Any loss of vacuum due to faulty seals on the access chamber installation, or indeed any other reason, will be readily detected and the test can then be repeated after the fault or faults have been remedied.

The apparatus of the present invention provides an easily portable test kit for testing the installation prior to the final stages, namely backfilling and concreting around the complete chamber unit (including corbel unit and frame). Using the apparatus of the present invention, one can ensure that the installed access chamber will effectively contain petroleum spirit or associated vapor, which is effectively and adequately sealed against water ingress and which is also proven to withstand the maximum likely pressure exerted by the surrounding ground water.

Figure 6:
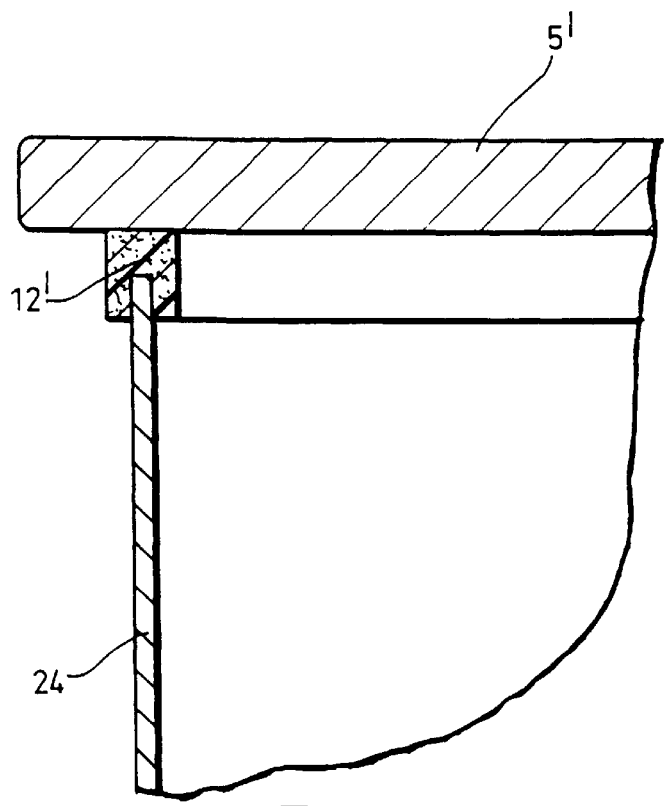
FIG. 6 is a partial section showing a first variant of the first seal means.
Figure 7:
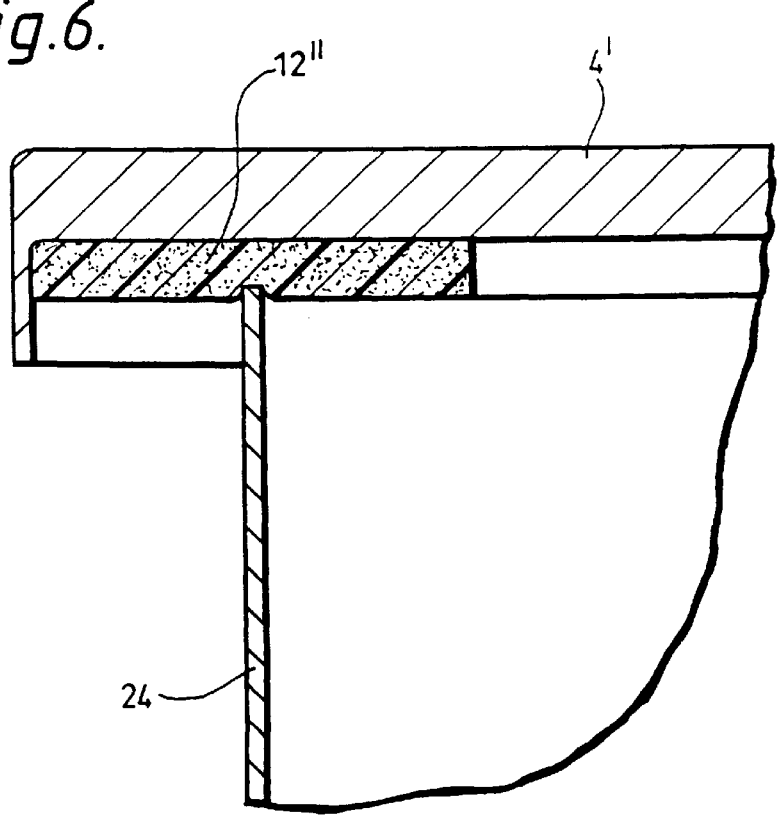
FIG. 7 is a partial section showing a second variant of the first seal means.

FIGS. 6, 7 and 8 illustrate different variants of the seal around the edge of the lid 5, for forming the air-tight connection between the lid and the chamber. In FIG. 6, a seal 12' of "NEOPRENE" or EPDM closed cell foam fits over the upper edge of the chamber by means of a slot provided in the seal, and serves both to provide the necessary air-tight seal with the lid 5' during testing and afterwards, may remain in place to form the seal with either a corbel unit or extension piece or a suitable lid.

In FIG. 7, a second variant of the seal 12" of "Neoprene" or EPDM closed cell foam, is relatively wide and runs around the periphery of the lid 4', the top edge of the chamber unit simply embedding into the seal 12" as shown.

In FIG. 8, a third variant of the seal 12''' simply comprises an endless band of Nitrile rubber which is stretched around and over the joint between the lid 5", sealing the joint as vacuum is applied.

In FIG. 9, the testing apparatus 10 (represented by the embodiment having a one piece lid 5 shown fitted to the chamber 24) is remote from a self contained unit 30 housing the vacuum pump, vacuum indicator/monitoring means as well as other utilities such as timers and performance monitoring. Unit 30 is installed at a minimum safe distance away from the installation, and linked to the testing apparatus 10 via respective pipes 35, 37 of the required length. Thus, any fire risk due to electrical sparking in the possible presence of petrol vapour is eliminated.

What is claimed is:

1. Apparatus for testing the integrity of an access chamber system during or after installation thereof, the apparatus including connection means for making a substantially fluid-tight connection with a part of the chamber system, evacuation means for evacuating the air within the chamber system to provide a vacuum therein, and indicator means for monitoring the level of vacuum over a predetermined period of time.

2. Apparatus according to claim 1 wherein there is included a separate lid for placing over the access chamber, (a corbel, or a frame).

3. Apparatus according to claim 2 wherein the lid is manufactured in a range of different sizes, to suit different access chamber installations.

4. Apparatus according to claim 2 wherein the lid is formed in a single piece.

5. Apparatus according to claim 4 wherein the central member includes the lid which may be hinged or sliding, to give access to the interior of the central member.

6. Apparatus according to claim 2 wherein the lid comprises two panels each being hinged to a central member, such that the panels may each be pivoted about a respective axis running parallel to the longitudinal axis of the central member, between a stowed position in which the two panels are face to face, and an operative position in which the two panels are adjacent in the same plane.

7. Apparatus according to claim 6 wherein the central member accommodates a vacuum pump, the indicator means, an associated electrical cable.

8. Apparatus according to claim 6 wherein the central member also includes handle means, preferably one handle at each end of the central member, whereby the lid may be placed in position by one or two operatives.

9. Apparatus according to claim 6 wherein the hinges are conveniently standard piano hinges.

10. Apparatus according to claim 6 further including a seal means comprising two separate seals, a first seal which extends around the periphery of the lid to form a seal with the upper edge of the access chamber or corbel unit and a second, thinner seal in the region of the two hinges between the central member and adjacent panels.

11. Apparatus according to claim 1 wherein the evacuation means and indicator means are remote from the lid, but are linked to it by means of two separate hoses or pipes, one to apply the vacuum and the other to test the vacuum.

12. A method of testing the integrity of an access chamber during installation thereof, a method comprising the steps of connecting a part of the chamber system to evacuation means in a substantially fluid-tight manner, operating the evacuation means to evacuate the air within the chamber system to provide a vacuum therein, and utilizing indicator means to monitor the level of vacuum over a predetermined period of time.

13. A method according to claim 12 wherein there is included the step of placing a lid over the access chamber or a corbel, or a frame and connecting the evacuation and indicator means to said lid.

* * * * *